(12) United States Patent
Sylvia et al.

(10) Patent No.: US 9,612,734 B1
(45) Date of Patent: Apr. 4, 2017

(54) RANDOM ACCESS BROWSER SCROLLING FOR LARGE PAGES

(71) Applicant: EMC Corporation, Hopkinton, MA (US)

(72) Inventors: Aaron Sylvia, Swansea, MA (US); Richard F. Cormier, Franklin, MA (US); Christopher M. Barrett, Medway, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 602 days.

(21) Appl. No.: 14/041,977

(22) Filed: Sep. 30, 2013

(51) Int. Cl.
*G06F 3/0485* (2013.01)

(52) U.S. Cl.
CPC ................. *G06F 3/04855* (2013.01)

(58) Field of Classification Search
CPC ... G06F 3/04855; G06F 3/0482; G06F 3/0485
USPC .................... 715/786; 707/999.102
See application file for complete search history.

(56) References Cited

U.S. PATENT DOCUMENTS

| 5,418,549 | A | 5/1995 | Anderson et al. |
| 6,061,063 | A * | 5/2000 | Wagner et al. ............... 715/784 |
| 6,204,846 | B1 | 3/2001 | Little et al. |
| 6,239,797 | B1 * | 5/2001 | Hills et al. ...................... 715/784 |
| 6,518,984 | B1 | 2/2003 | Maeckel et al. |
| 7,032,186 | B1 | 4/2006 | Gasser et al. |
| 7,401,298 | B1 * | 7/2008 | Sexton et al. ................ 715/786 |
| 2008/0155387 | A1 * | 6/2008 | Yabe .............................. 715/204 |
| 2009/0172588 | A1 * | 7/2009 | Lee et al. ...................... 715/786 |
| 2012/0117509 | A1 * | 5/2012 | Powell et al. ................ 715/786 |
| 2013/0086464 | A1 * | 4/2013 | Thangappan ................. 715/227 |
| 2013/0132892 | A1 * | 5/2013 | Lentz et al. .................. 715/786 |
| 2014/0075376 | A1 * | 3/2014 | Tsuda et al. .................. 715/787 |
| 2014/0193136 | A1 * | 7/2014 | Nishizawa et al. ........... 386/248 |

* cited by examiner

*Primary Examiner* — Andrew Tank
(74) *Attorney, Agent, or Firm* — BainwoodHuang

(57) ABSTRACT

A method includes (a) loading into system memory of a computing device a set of records of a plurality of equally-spaced records which are to be visible in a GUI window, (b) placing the loaded set of records within a dynamic markup page for display within the GUI window, (c) placing a container within the dynamic markup page, the container representing non-visible records of the plurality of equally-spaced records, the container having a height representative of a combined height of the represented non-visible records, and (d) displaying, on the display device, a scroll bar adjunctive to the GUI window, the scroll bar allowing a user of the computing device to scroll to any arbitrary position in the document for display within the GUI window. Other embodiments are directed to a computerized apparatus and computer program products for performing methods similar to that described above.

15 Claims, 6 Drawing Sheets

RANDOM ACCESS BROWSER SCROLLING FOR LARGE PAGES

BACKGROUND

Users often browse pages that contain large amounts of data. In some conventional systems, these pages are displayed by first loading all of the data, and then allowing the use to scroll through the entire page. In other conventional systems, the browser loads only a portion of the data, and once the user attempts to scroll past the loaded data, additional data is loaded.

SUMMARY

The above-described conventional systems for displaying pages containing large amounts of data may suffer from deficiencies. For example, loading all the data prior to displaying a page may cause a high latency in page load times, especially over slow connections or in cases of extremely large data sets. In addition, for extremely large data sets, it is possible that not all of the data will be able to fit within system memory; this may introduce thrashing as memory is swapped to disk. It is even possible that the available swap space may be overwhelmed, preventing the page from being fully loaded and displayed.

As an additional example, conventional systems which load portions of the data only as they are sequentially accessed are deficient because the scroll bar does not reflect the full size of the data set. Thus, the user is not able to quickly scroll to any arbitrary location within the page because moving the scroll bar all the way down will only serve to scroll a portion of the way down the page and then load a next portion of data.

Thus, it would be desirable to alleviate these concerns by displaying large documents without a high latency in load times, but also allowing a user to scroll to random locations without first scrolling through the entire page. Furthermore, it would be desirable to avoid consuming too much system memory while a large document is loaded. Therefore, improved techniques are presented for loading portions of a large document in a random-access manner utilizing empty containers in a dynamically-modified display page.

One embodiment of the improved techniques is directed to a method, performed by a computing device, of rendering a document in a graphical user interface (GUI) window of a display device, the document having a plurality of equally-spaced records. The method includes (a) loading into system memory of the computing device a set of records of the plurality of equally-spaced records which are to be visible in the GUI window, (b) placing the loaded set of records within a dynamic markup page for display within the GUI window, (c) placing a container within the dynamic markup page, the container representing non-visible records of the plurality of equally-spaced records, the container having a height representative of a combined height of the represented non-visible records, and (d) displaying, on the display device, a scroll bar adjunctive to the GUI window, the scroll bar allowing a user of the computing device to scroll to any arbitrary position in the document for display within the GUI window. In some embodiments, additional containers are used as needed. Some embodiments are directed to a computerized apparatus and computer program products for performing methods similar to that described above.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments are directed to improved techniques for loading portions of a large document in a random-access manner utilizing empty containers in a dynamically-modified display page.

Figure 1:
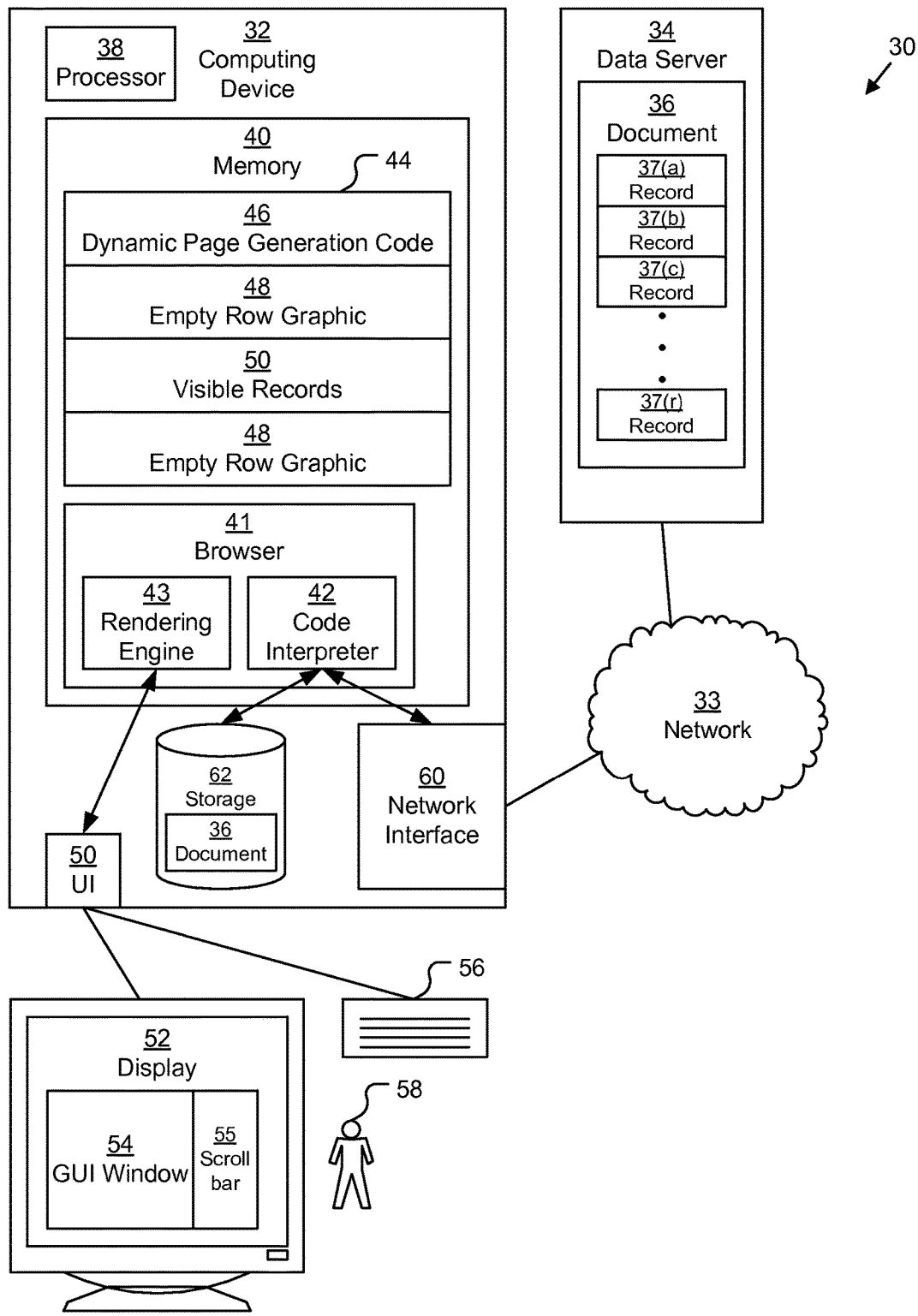
FIG. 1 depicts an example system for use in performing various embodiments.

FIG. 1 depicts an example system 30. System 30 includes a computing device 32 which connects to a network 33, which allows it to access a remote data server 34 that provides access to a large document 36 stored on the data server 34. Document 36 includes a plurality of data records 37 (depicted as records 37(a), 37(b), 37(c), . . . , 37(r), where r is a large number, e.g., 10 million). When displayed, the records 37 are said to be "evenly-spaced" because each record has a uniform display height. Remote data server 34 may be any kind of network-connectable computing device, such as, for example, a personal computer, a workstation computer, a server computer, an enterprise server computer, a cellular phone, a smart phone, a tablet, a laptop computer, etc., however, remote data server 34 will typically be a server computer or an enterprise server computer with a large storage capacity running a web server.

Network 33 may be any kind of data communication network, such as for example the Internet, a local area network, a wide area network, a virtual private network, a cellular data network, a wireless local area network, an interconnected fabric of connections and switches, similar systems, and combinations thereof.

Computing device 32 includes a processor 38, system memory 40, a user interface (UI) 50, data storage 62, and a network interface 60. Processor 38 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface 60 interfaces with network 33. Network interface 60 may include an Ethernet card, a cellular modem, a Wireless Fidelity (WiFi) wireless networking adapter, any other device for connecting to a network, or some combination thereof.

UI 50 allows the computing device 32 to interact with a user 58 by displaying a GUI window 54 with an adjunct scroll bar 55 to the user 58 on a connected display device 52 and receiving instructions from the user 58 via a connected input device 56. Display 52 may be any kind of display device capable of displaying a GUI, such as, for example, a cathode ray tube, a liquid crystal display, a projection device, a plasma display, or a similar device as is well-known in the art. Display 52 may also include more than one display device, each of which may use the same or different display technologies. Input device 56 may include any kind of user input devices such as, for example, a keyboard, a keypad, a mouse, a trackpad, a tracking ball, a pen-based digitizer, a stylus-based digitizer, or a similar device as is well-known in the art. Input device 56 may also include more than one user input device. In some embodiments, display 52 and user input device 56 may be combined into a single device, such as, for example, a touch-sensitive display screen. UI 50 may include one or more of a graphics adapter, a touch-based input controller, a mouse interface, a keyboard interface, a universal serial bus, or other similar devices.

Data storage 62 includes persistent storage (e.g., solid-state storage and/or disk-based storage) for storing programs and data even while the computing device 32 is powered off. In some embodiments, instead of document 36 residing within remote data server 34, document 36 is stored locally within storage 62.

System memory 40 may be any kind of digital system memory, such as, for example, RAM. Memory 40 (the terms "memory" and "system memory" are used interchangeably henceforth) stores programs and applications executing on processor 38 as well as data used by those programs. Memory 40 stores an operating system (not depicted) as well as various other software modules (some of which may be independent applications, while others are parts of other applications or the operating system). One application within memory 40 is a browser 41. Browser 41 is stored within system memory 40 as it executes, and it also stores data within system memory 40 in conjunction with its execution. Browser 41 includes a code interpreter module 42 as well as a rendering engine 43. Code interpreter module 42 may include, for example, a JavaScript interpreter for executing JavaScript code. Rendering engine 43 is configured to render web pages (and other similar kinds of pages) to the GUI window 54 via UI 50.

Memory 40 also includes a display page 44 to be rendered within GUI window 54 by rendering engine 43. Display page 44 may be, for example, a dynamic HTML page (DHTML), although, in general, it may be any kind of dynamically-modifiable markup page (i.e., written in a markup language such as HTML or XML). Display page 44 includes a set of visible records 50 from the document 36. The visible records 50 are records that are displayed within GUI window 54 when the display page 44 is rendered by the rendering engine 43 for display. In addition, display page 44 includes one or more empty row graphics (ERGs) 48. ERGs 48 are empty containers that take the place of records 37 from document 36 which are not visible within GUI window 54. Each ERG 48 has a height that represents a set of contiguous records 37 from the document, the height being a product of the fixed record height and the number of records 37 represented by that ERG 48. Although two ERGs 48 are depicted, one preceding and one following the set of visible records 50, one of these ERGs 48 may not actually be present at any given time. Thus, when the beginning of the document 36 is to be displayed within GUI window 54, the set of visible records 50 are from the beginning of the document (i.e., at least including first record 37(a)), and no ERG 48 precedes the set of visible records 50. However, since not all records 37 will fit within the GUI window 54, all (or, in some cases, not all, but many) records 37 following those within the set of visible records 50 are represented by the ERG 48 following the set of visible records 50. On the other hand, when the end of the document 36 is to be displayed within GUI window 54, the set of visible records 50 are from the end of the document (i.e., at least including last record 37(r)), and no ERG 48 follows the set of visible records 50. However, since not all records 37 will fit within the GUI window 54, all (or, in some cases, not all, but many) records 37 preceding those within the set of visible records 50 are represented by the ERG 48 preceding the set of visible records 50. In yet other situations, the set of visible records 50 is drawn from a location in the middle of the document 36, in which case, records 37 from the beginning of the document 36 are represented by an ERG 48 preceding the set of visible records 50, while records 37 from the end of the document 36 are represented by an ERG 48 following the set of visible records 50. In some embodiments, an ERG 48 is an HTML DIV element having a height attribute set to the height of the records 37 that that ERG 48 represents. Typically, the DIV element will have no contents.

In addition, although two ERGs 48 are depicted, one preceding and one following the set of visible records 50, additional ERGs 48 may also be present in some embodiments. Thus, if the user jumps around within document 36 several times, in some embodiments, record 37 loaded into memory may be interspersed within display page 44 together with visible records 50 and as many intervening ERGs 48 as necessary.

Display page 44 also includes dynamic page generation code 46, which is interpreted by code interpreter module 42 to dynamically generate and modify the rest of display page 44, for example, by loading the set of visible records 50 and by generating the ERGs 48 or by modifying attributes of the ERGs 48 as necessary.

Although system memory 40 stores programs and data in active use by the processor 38, data storage 62 may store programs and data even while the computing device 32 is powered off. The operating system and the applications (e.g., browser 41) are typically stored both in system memory 40 and in persistent storage 62 so that they may be loaded into system memory 40 from persistent storage 62 upon a system restart. Applications (e.g., browser 41), when stored in non-transient form either in system memory 40 or in persistent storage 62, form a computer program product. The processor 38 running one or more of these applications (e.g., browser 41) thus forms a specialized circuit constructed and arranged to carry out the various processes described herein.

Figure 2:
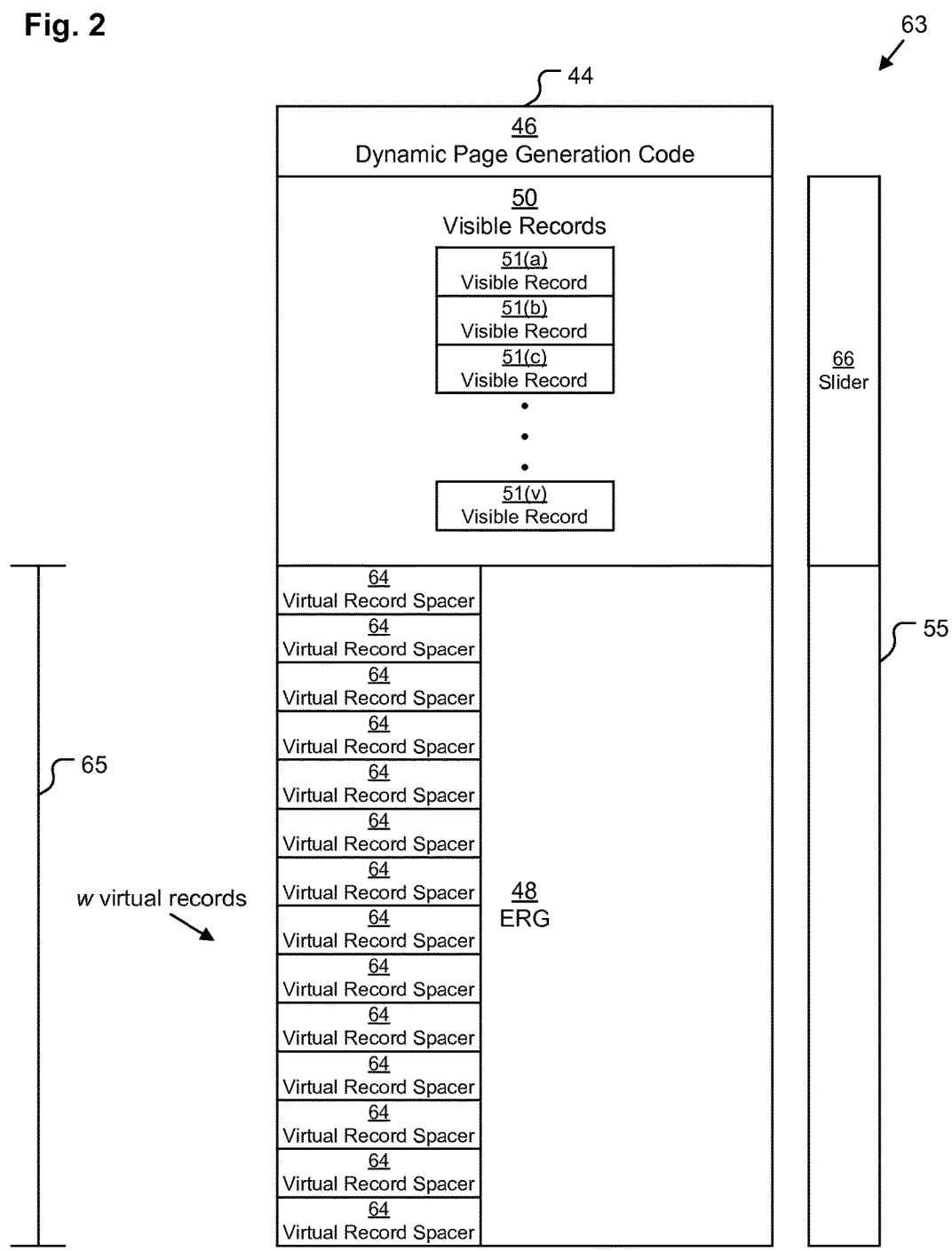
FIG. 2 depicts an example display page according to a first example use case.

FIG. 2 depicts an example display page 44 according to a first example use case 63. Use case 63 represents a typical initial configuration of display page 44 upon first being loaded, the document 36 being scrolled to the top. Thus, code interpreter module 42 loads visible records 51(a), 51(b), 51(c), . . . , 51(v) (there being v visible records 51) within system memory 40 and stores them as the set of visible records 50 at the top of display page 44, just following the dynamic page generation code 46 (although, in some embodiments, dynamic page generation code 46 may be located elsewhere within the display page 44). Because the document 36 is scrolled to the top, as indicated by the position of slider element 66 in the topmost position within scroll bar 55, there is no ERG 48 preceding the set of visible records 50. However, since the number of visible records, v, is less than the total number of records, r, there are w=r-v non-visible records 37. Each of the w non-visible records 37 may be thought of as virtually being placed within an ERG 48 following the set of visible records 50. Thus, there are w virtual record spacers 64 logically placed within the ERG 48 following the set of visible records 50.

Given a fixed record height, dynamic page generation code 46 sets the height attribute of the ERG 48 following the set of visible records 50 to be a height 65 equal to the fixed record height for the document 36 multiplied by the number, w, of virtual record spacers 64 logically placed within that ERG 48.

Figure 3:
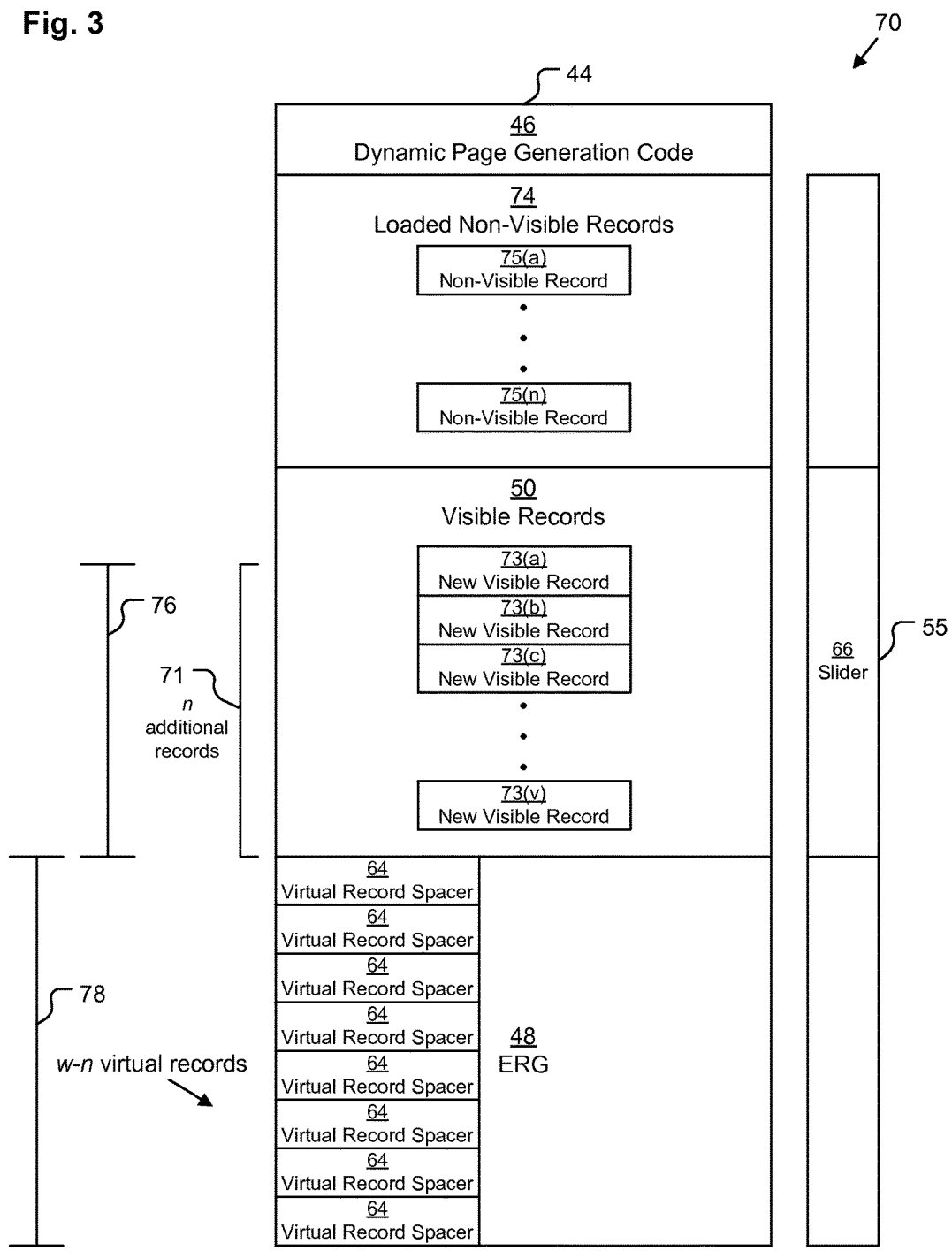
FIG. 3 depicts an example display page according to a second example use case.

FIG. 3 depicts an example display page 44 according to a second example use case 70. Use case 70 represents a typical non-initial configuration of display page 44 upon user 58 dragging slider element 66 a short distance down the scroll bar 55. In use case 70, code interpreter module 42 loads a set 71 of n additional records 37 from document immediately following the loaded visible records 51 from use case 63. Thus, the set of visible records 50 shifts down to include at least one record from the set 71 of additional records 37. Because the record height is fixed, as long as the size of the GUI window 54 does not change, the number of records 37 in the set of visible records 50 remains v. Thus, the set of visible records 50 now includes v newly-visible records 73(a), 73(b), 73(c), . . . , 73(v). Depending how far the user 58 has scrolled down, some of the new visible records 73 may overlap with some of the old visible records 51. Thus, for example, if the user 58 has scrolled down by exactly v−2 records, then new visible record 73(a) would be the same as old visible record 51(v−1) and new visible record 73(b) would be the same as old visible record 51(v). But, if the user 58 has scrolled down by v or more records, then the sets will not overlap. Because the user 58 has only dragged the slider element 66 a short distance, the set 71 of additional records 37 does not take up much additional space in memory 40, so no records 37 are unloaded from memory 40. For example, if each record takes up 10 kilobytes, and n is equal to 20, only 200 kilobytes of additional memory 40 are needed, so it is not worthwhile to unload records from memory 40; this is advantageous if the user 58 wishes to scroll back up to reexamine records 37 that he has already seen. Thus, the set of visible records 50 is now preceded by a set 74 of loaded non-visible records 75. As long as the size of the GUI window 54 remains constant, the size of the set 74 will also be n, so the loaded non-visible records 75 are depicted as 75(a), 75(b), 75(c), . . . , 75(n). Because all records 37 within display document 44 prior to the set of visible records 50 are loaded into memory (i.e., as set 74 of loaded non-visible records 75), there is no ERG 48 preceding the set of visible records 50. However, since the slider element 66 has not been dragged all the way to the bottom of scroll bar 55, there are r−v−n=w−n non-visible records 37 remaining below the set of visible records 50. Each of these w−n non-visible records 37 may be thought of as virtually being placed within an ERG 48 following the set of visible records 50. Thus, there are w−n virtual record spacers 64 logically placed within the ERG 48 following the set of visible records 50. Given a fixed record height, dynamic page generation code 46 sets the height attribute of the ERG 48 following the set of visible records 50 to be a height 78 equal to the fixed record height for the document 36 multiplied by the number, w−n, of virtual record spacers 64 logically placed within that ERG 48.

Figure 4:
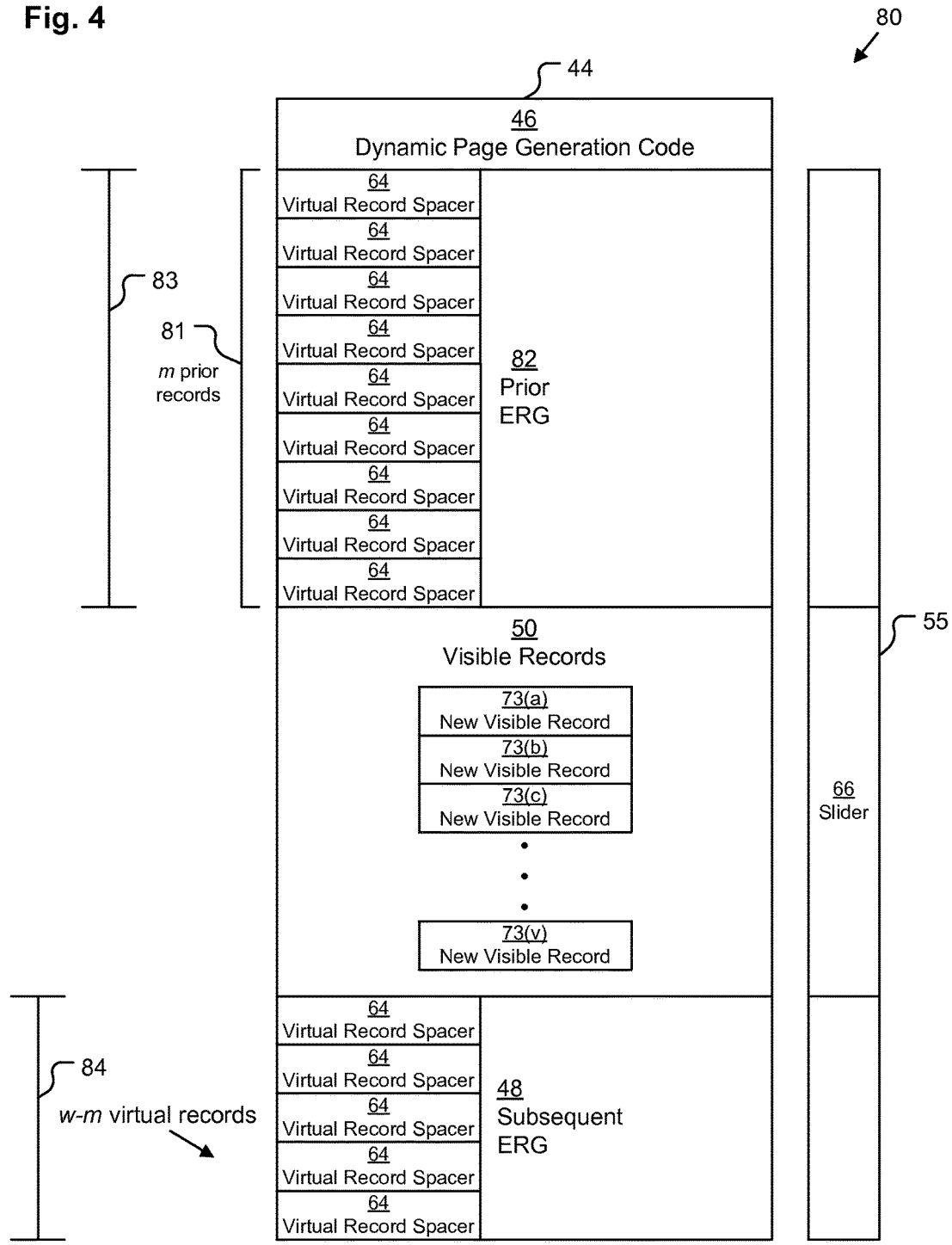
FIG. 4 depicts an example display page according to a third example use case.

FIG. 4 depicts an example display page 44 according to a third example use case 80. Use case 80 represents a typical non-initial configuration of display page 44 upon user 58 dragging slider element 66 a longer distance down the scroll bar 55 to an arbitrary position within the large document 36. In use case 80, code interpreter module 42 loads an entirely new set of visible records 50. Because the record height is fixed, as long as the size of the GUI window 54 does not change, the number of records 37 in the set of visible records 50 remains v. Thus, the set of visible records 50 now includes v newly-visible records 73(a), 73(b), 73(c), . . . , 73(v). Because the user 58 has dragged the slider element 66 a long distance (m>n), it would take up too much space in memory 40 to store all m preceding records 81, so some or all of these preceding records 81 may be unloaded from memory 40. For example, if each record takes up 10 kilobytes, and m is equal to 500,000, 5 gigabytes of additional memory 40 would be needed, so records 37 are unloaded from memory 40. Because now not all records 37 within display document 44 prior to the set of visible records 50 are loaded into memory, a prior ERG 82 precedes the set of visible records 50 having m virtual record spacers 64 logically placed within the prior ERG 82. Given a fixed record height, dynamic page generation code 46 sets the height attribute of the prior ERG 82 to be a height 83 equal to the fixed record height for the document 36 multiplied by the number, m, of virtual record spacers 64 logically placed within that prior ERG 82. In some embodiments, the prior ERG 82 pre may have fewer than m elements, if, for example, the set of visible records 50 is buffered by loading a few extra records preceding new visible record 73(a); in such embodiments, the height 83 is calculated accordingly. In another example, in some embodiments, the originally-loaded set of visible records 50 may remain loaded in memory 40 towards the top of display page 44, the prior ERG 82 representing m−v (rather than m) records 37.

Returning to FIG. 4 as depicted, since the slider element 66 has still not been dragged all the way to the bottom of scroll bar 55, there are r−v−m=w−m non-visible records 37 remaining below the set of visible records 50. Each of these w−m non-visible records 37 may be thought of as virtually being placed within an ERG 48 following the set of visible records 50. Thus, there are w−m virtual record spacers 64 logically placed within the ERG 48 following the set of visible records 50. Given a fixed record height, dynamic page generation code 46 sets the height attribute of the ERG 48 following the set of visible records 50 to be a height 84 equal to the fixed record height for the document 36 multiplied by the number, w−m, of virtual record spacers 64 logically placed within that ERG 48.

In another use case (not depicted), user 58 may drag slider element 66 up or down a long distance within scroll bar 55 after the set of visible elements 50 has already been dragged just a short distance (e.g., after use case 70). In such a use case, the prior ERG 82 of FIG. 4 may follow the previously-generated set 74 of loaded non-visible records 75 (or, if the user 58 has dragged up a long distance after first dragging up a short distance, the subsequent ERG 48 may precede a previously-generated set 74 of loaded non-visible records 75).

In yet another use case (not depicted), user 58 may drag slider element 66 up or down a short distance within scroll bar 55 after the set of visible elements 50 has already been moved into the middle of the document 36 (e.g., after use case 80). In such a use case, there may be a set 74 of loaded non-visible records 75 added to what is depicted in FIG. 4 either above or below the set of visible records 50 (depending whether the user 58 has dragged up or down).

In yet another use case (not depicted), user 58 may drag slider element 66 up or down a long distance a second time after already having dragged the slider element 66 down a long distance (as depicted in use case 80). In such a use case, in some embodiments, the loaded new visible records 73 from use case 80 may be unloaded from memory 40 and then use case 80 is repeated with a new set 50 of new visible records 73. However, in other embodiments, the loaded new visible records 73 from use case 80 may instead be considered to be a set 74 of loaded non-visible records 75, an extra (third) ERG 48 interposing between the current new visible records 73 and the set 74 of loaded non-visible records 75. In these embodiments, the subsequent ERG 48 is also made smaller when the second long dragging is down, and the prior ERG 82 is made smaller when the second long dragging is up. In addition, in these embodiments, it is possible for more than three ERGs 48 to be used; every time the user 58 performs a long drag operation, an additional ERG 48 may be created.

Other use cases are also possible, but they are not described because they are variations on the above use cases (e.g., the slider element 66 being dragged all the way down, dragging the slider element 66 up a short distance, etc.), and a person having ordinary skill on the art would understand how to apply the principles described in this Disclosure to those other use cases in an analogous manner.

Figure 5:
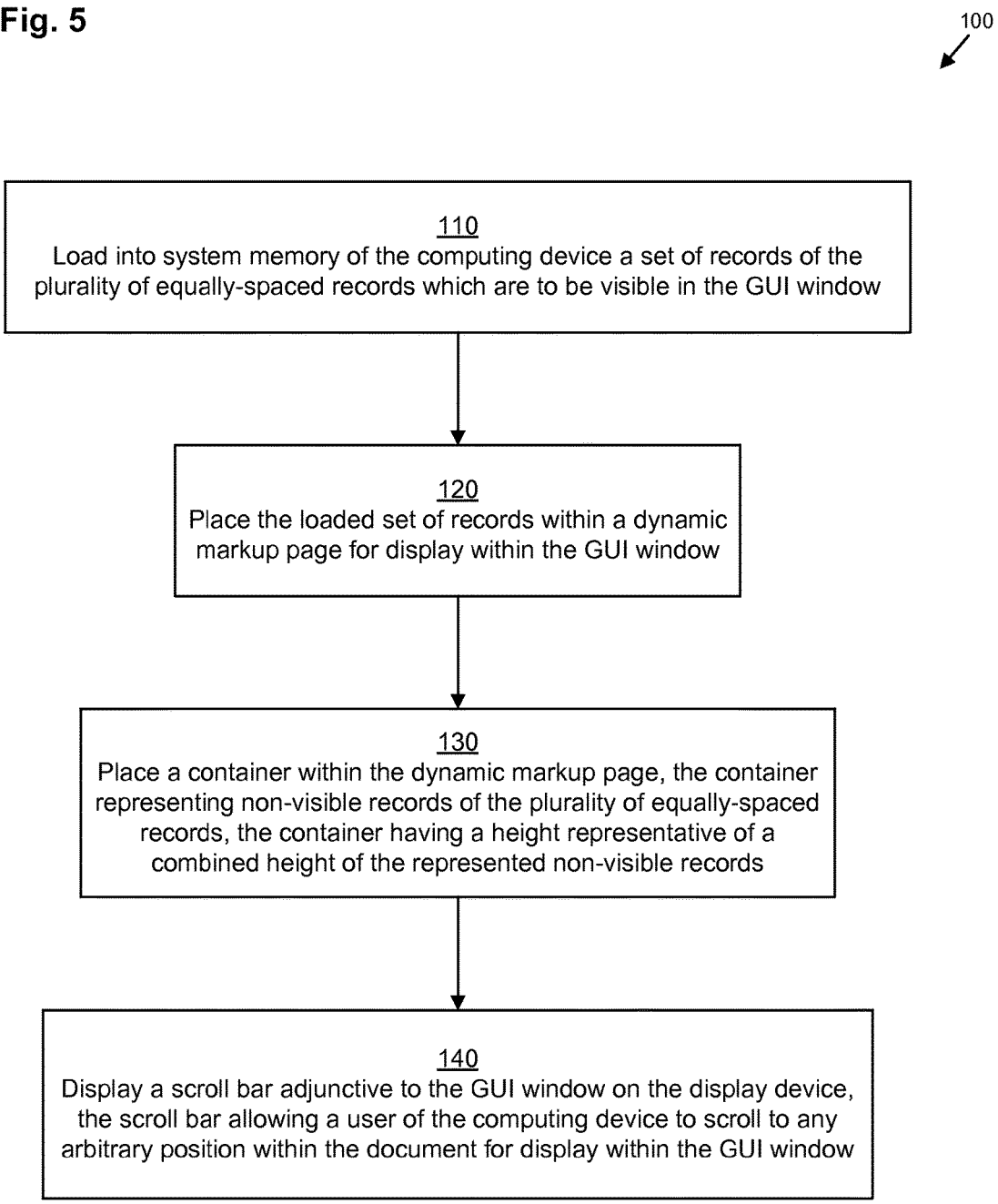
FIG. 5 depicts an example method according to various embodiments.

FIG. 5 illustrates, as method 100, example operation of browser 41 on computing device 32 for loading a portion of a large document 36 utilizing an empty container to allow proper scroll bar 55 operation. It should be understood that any time a piece of software, such as, for example, browser 41, is described as performing a method, process, step, or function, in actuality what is meant is that a computing device (e.g., computing device 32) on which that piece of software is running performs the method, process, step, or function when executing that piece of software on its processor (e.g., processor 38). It should also be understood that, in some embodiments, instead of processor 38 executing code of browser 41, specialized circuitry of the computing device 32 operates to perform the method, process, step, or function directly in hardware.

In step 110, code interpreter module 42 of browser 41, upon executing code from the dynamic page generation code 46 of the display page 44, loads a set of visible records 50 into memory 40. In step 120, code interpreter module 42 of browser 41, upon executing code from the dynamic page generation code 46 of the display page 44, places the loaded set of visible records 50 within the display page 44 for display in the GUI window 54.

In step 130, code interpreter module 42 of browser 41, upon executing code from the dynamic page generation code 46 of the display page 44, places a container (e.g., ERG 48) within the display page 44. The container represents non-visible records 37 which are not already loaded into the display page 44, and it has a height representative of a combined height of the represented non-visible records 37, as discussed above. In some cases, step 130 includes creating the ERG 48 as well as assigning it a proper height, while in other cases, the ERG 48 is already in place, so step 130 is mainly about assigning it an updated height. In some cases, step 130 involves a single ERG 48 (e.g., use cases 63 and 70), while in other cases, step 130 involves multiple ERGs 48 (e.g., use case 80).

In step 140, after rendering the loaded set of visible records 50 within GUI window 54, rendering engine 43 of browser 41 displays scroll bar 55 adjunctive to the GUI window 54 on the display device 52, the scroll bar 55 allowing a user 58 of the computing device 32 to scroll to any arbitrary position within the document 36 for display within the GUI window 54.

Figure 6:
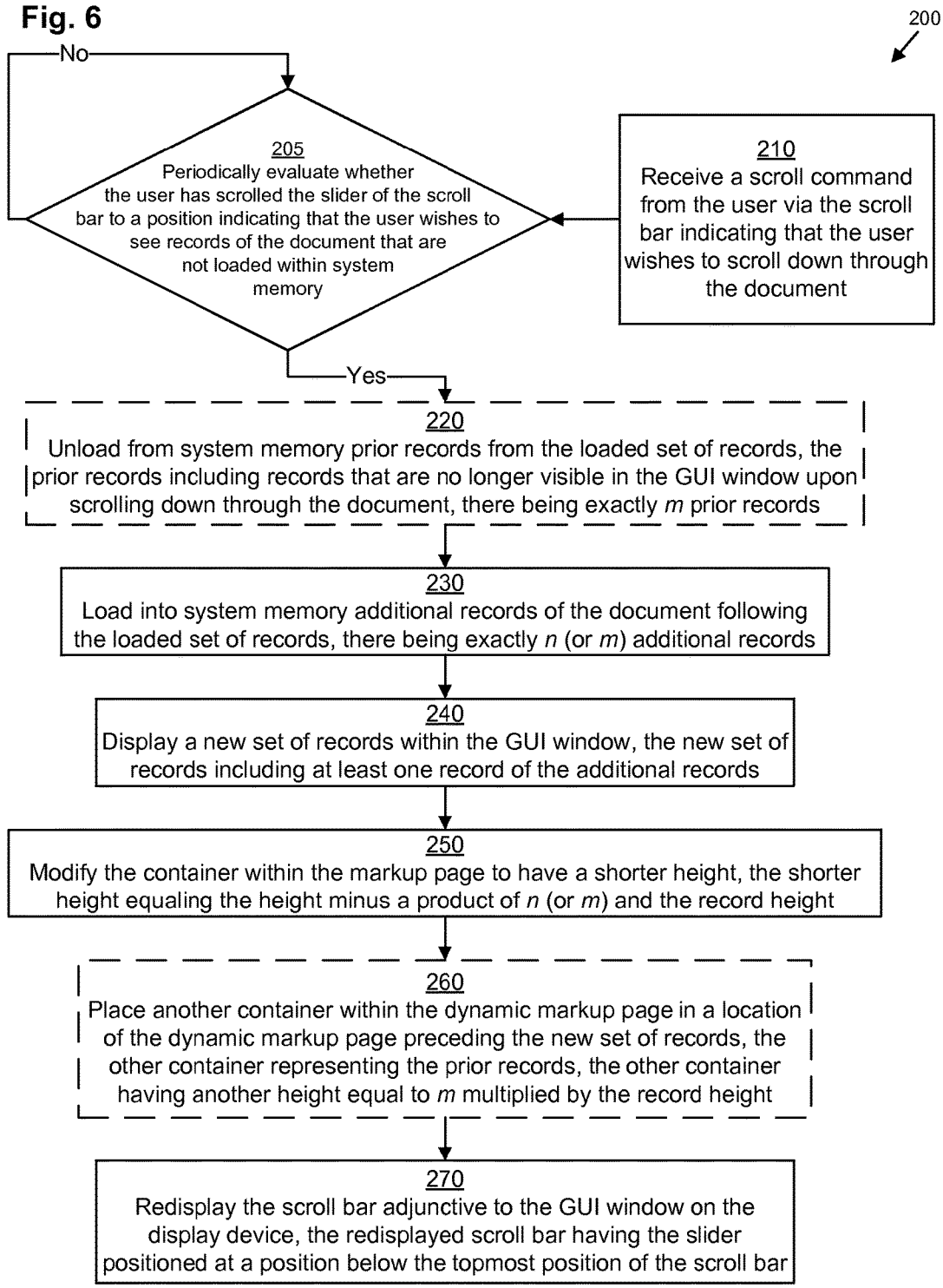
FIG. 6 depicts another example method according to various embodiments.

FIG. 6 illustrates, as method 200, example steps which follow method 100 in certain embodiments to allow for dynamism in the display of document 36 when the user 58 attempts to scroll within document 36.

In step 205, code interpreter module 42 of browser 41, upon executing code from the dynamic page generation code 46 of the display page 44, periodically evaluates whether the user 58 has scrolled the slider element 66 of the scroll bar 55 to a position indicating that the user 58 wishes to see records 37 of the document 36 that are not loaded within system memory 40. This periodic evaluation may be done at a variety of periodicities. The period interval is typically set within the dynamic page generation code 46. An example period interval for step 205 set within dynamic page generation code 46 is one second; this period is advantageous because it provides an acceptably fast response time, but it does not overburden the processor 38.

In step 210, browser 42 actually receive a scroll command from the user 58 via the scroll bar 55 indicating that the user 58 wishes to scroll down through the document 36. This event allows code interpreter module 42 to break free from the periodic loop of step 205 and proceed to step 220 or step 230.

In step 230, code interpreter module 42 loads a set 71 of additional records 37 from the document 36 into system memory 40 following the loaded set of visible records 50 from prior to the user 58 scrolling down. In use case 70, there are exactly n additional records, and in use case 80, there are exactly m additional records.

Optional step 220, which is typically performed prior to step 230 (although it may be performed in parallel with step 230 or after step 230 in some embodiments) is performed, in certain embodiments, in the context of use cases (e.g., use case 80) in which the user 58 scrolls past a large number of records 37. The exact threshold may vary by embodiment, but, in one example embodiment, optional step 220 is performed only when the set 71 of additional records 37 is larger than one gigabyte, while in another example embodiment, optional step 220 is performed only when the set 71 of additional records 37 contains more than 100,000 records. In other embodiments, even in the context of a long drag operation step 220 is not performed. When step 220 is performed (e.g., use case 80), code interpreter module 42 unloads all m preceding records 81 (or, in some embodiments, fewer than m of the preceding records 81 if buffering is performed) from memory 40, removing those preceding records 81 from the display page 44.

In step 240, rendering engine 43 of browser 41 displays the set of visible records 50, now including v newly-visible records 73(a), 73(b), 73(c), . . . , 73(v), within GUI window 54. In use case 70, at least one of the newly-visible records 73 is different than one of the old visible records 51, and in use case 80, all of the newly-visible records 73 are different than the old visible records 51.

In step 250, which may be performed in parallel with step 240, code interpreter module 42 modifies the ERG 48 following the visible set of records 50 within display page 44 to have a shorter height. The height is reduced from the initial height representing w virtual records (e.g., height 65) to a shorter height representing w-n virtual records (e.g., height 78) in use case 70 or a shorter height representing w-m virtual records (e.g., height 84) in use case 80.

In optional step 260, which may be performed in parallel with steps 240 and 250, code interpreter module 42 inserts a prior ERG 82 preceding the visible set of records 50 within display page 44 to represent the preceding records 81. Step 260 is only performed when the user 58 has performed a long drag operation. The height of the prior ERG 82 preceding the visible set of records 50 is set to represent m preceding virtual records 64 (e.g., height 83), although, in some embodiments, the prior ERG 48 may instead represent fewer than m virtual records 64, as discussed above.

Finally, in step 270, rendering engine 43 of browser 41 redisplays the scroll bar 55 adjunctive to the GUI window 54 on the display device 52, the redisplayed scroll bar 55 having the slider element 66 positioned at a position below the topmost position of the scroll bar 55 (e.g., see the position of slider element 66 in FIGS. 3 and 4).

It should be understood that although method 200 has been described in the context of the user 58 scrolling down through the document 36, an analogous method may operate in the context of the user 58 scrolling up through the document 36.

Thus, techniques have been described for loading portions of a large document 36 in a random-access manner utilizing ERGs 48 in a dynamically-modified display page 44.

While various embodiments of the present disclosure have been particularly shown and described, it will be understood by those skilled in the art that various changes in form and details may be made therein without departing from the spirit and scope of the present disclosure as defined by the appended claims.

For example, although embodiments have been described in the context of equally-spaced records 37, this is by way of example only. In some embodiments, there may be several different classes of records 37, each different class of record 37 having a different record height. This still allows the ERGs 48 to be sized appropriately as long as the number of records 37 of each class within any given area are known.

Furthermore, although various embodiments have been described as being methods, software embodying these methods is also included. Thus, one embodiment includes a tangible non-transitory computer-readable storage medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Furthermore, the terms "execute" and "run" and "perform" and "carry out" used in conjunction with an instruction as used herein may refer not only to a processor or controller directly executing an instruction, but it may also refer to the processor or controller operating a virtual machine or interpreter application to indirectly cause the instruction to be executed, run, performed, or carried out.

Furthermore, it should be understood that all embodiments which have been described may be combined in all possible combinations with each other, except to the extent that such combinations have been explicitly excluded.

Finally, even if a technique, method, apparatus, or other concept is specifically labeled as "conventional," Applicants make no admission that such technique, method, apparatus, or other concept is actually prior art under 35 U.S.C. §102 or 35 U.S.C. §103, such determination being a legal determination that depends upon many factors, not all of which are known to Applicants at this time.

What is claimed is:

1. A method, performed by a computing device, of rendering a document in a graphical user interface (GUI) window of a display device, the document having a plurality of equally-spaced records, the method comprising:
   loading into system memory of the computing device a set of records of the plurality of equally-spaced records which are to be visible in the GUI window;
   placing the loaded set of records within a dynamic markup page for display within the GUI window;
   placing a container within the dynamic markup page, the container representing non-visible records of the plurality of equally-spaced records, the container having a height representative of a combined height of the represented non-visible records; and
   displaying, on the display device, a scroll bar adjunctive to the GUI window, the scroll bar allowing a user of the computing device to scroll to any arbitrary position in the document for display within the GUI window;
wherein:
   the loaded set of records are at a beginning of the plurality of equally-spaced records within the document, the non-visible records following the loaded set of records within the document;
   placing the container within the dynamic markup page includes placing the container in a location of the dynamic markup page following the loaded set of records;
   displaying the scroll bar includes displaying a slider of the scroll bar, the slider being positioned at a topmost position of the scroll bar;
   placing the container within the dynamic markup page further includes setting the height of the container to be equal to a number of the non-visible records multiplied by a record height, the number of the non-visible records being equal to the plurality minus a size of the loaded set of records, the record height being a height in pixels corresponding to the equal-spacing of the plurality of records within the document;
   the method further comprises:
      receiving a scroll command from the user via the scroll bar indicating that the user wishes to scroll down through the document;
      loading into system memory additional records of the document following the loaded set of records, there being exactly n additional records;
      displaying a new set of records within the GUI window, the new set of records including at least one record of the additional records;
      modifying the container within the markup page to have a shorter height, the shorter height equaling the height minus a product of n and the record height;
      redisplaying the scroll bar adjunctive to the GUI window, the redisplayed scroll bar having the slider positioned at a position below the topmost position of the scroll bar; and
      periodically evaluating whether the user has scrolled the slider of the scroll bar to a position indicating that the user wishes to see records of the document that are not loaded within system memory;
   loading the additional records, displaying the new set of records, modifying the container, and redisplaying the scroll bar are performed in response to an evaluation that the user has scrolled the slider of the scroll bar to a position indicating that the user wishes to see records of the document that are not loaded within system memory, the evaluation having been performed as part of the periodically evaluating; and
   periodically evaluating is performed at periodic intervals of one second.

2. The method of claim 1 wherein loading the set of records into system memory of the computing device includes loading the set of records from a database stored remote from the computing device across a network connection.

3. The method of claim 1 wherein the container is an HTML DIV element having a height attribute set to the height of the container.

4. A method, performed by a computing device, of rendering a document in a graphical user interface (GUI) window of a display device, the document having a plurality of equally-spaced records, the method comprising:
- loading into system memory of the computing device a set of records of the plurality of equally-spaced records which are to be visible in the GUI window;
- placing the loaded set of records within a dynamic markup page for display within the GUI window;
- placing a container within the dynamic markup page, the container representing non-visible records of the plurality of equally-spaced records, the container having a height representative of a combined height of the represented non-visible records; and
- displaying, on the display device, a scroll bar adjunctive to the GUI window, the scroll bar allowing a user of the computing device to scroll to any arbitrary position in the document for display within the GUI window;

wherein:
- the loaded set of records are at a beginning of the plurality of equally-spaced records within the document, the non-visible records following the loaded set of records within the document;
- placing the container within the dynamic markup page includes placing the container in a location of the dynamic markup page following the loaded set of records;
- displaying the scroll bar includes displaying a slider of the scroll bar, the slider being positioned at a topmost position of the scroll bar;
- placing the container within the dynamic markup page further includes setting the height of the container to be equal to a number of the non-visible records multiplied by a record height, the number of the non-visible records being equal to the plurality minus a size of the loaded set of records, the record height being a height in pixels corresponding to the equal-spacing of the plurality of records within the document;

the method further comprises:
- receiving a scroll command from the user via the scroll bar indicating that the user wishes to scroll down through the document;
- loading into system memory additional records of the document following the loaded set of records, there being exactly n additional records;
- displaying a new set of records within the GUI window, the new set of records including at least one record of the additional records;
- modifying the container within the markup page to have a shorter height, the shorter height equaling the height minus a product of n and the record height;
- redisplaying the scroll bar adjunctive to the GUI window, the redisplayed scroll bar having the slider positioned at a position below the topmost position of the scroll bar;
- unloading from system memory prior records from the loaded set of records, the prior records including records that are no longer visible in the GUI window upon scrolling down through the document, there being exactly m prior records;
- placing another container within the dynamic markup page in a location of the dynamic markup page preceding the new set of records, the other container representing the prior records, the other container having another height equal to m multiplied by the record height; and
- periodically evaluating whether the user has scrolled the slider of the scroll bar to a position indicating that the user wishes to see records of the document that are not loaded within system memory;
- loading the additional records, unloading the prior records, displaying the new set of records, modifying the container, placing the other container, and redisplaying the scroll bar are performed in response to an evaluation that the user has scrolled the slider of the scroll bar to a position indicating that the user wishes to see records of the document that are not loaded within system memory, the evaluation having been performed as part of the periodically evaluating; and the method further comprises:
- in response to a subsequent periodic evaluation, determining that the user has scrolled the slider of the scroll bar to another position indicating that the user wishes to see other records of the document that are not loaded within system memory; and
- in response to determining that the user has scrolled the slider of the scroll bar to the other position:
  - clearing containers and loaded records from the dynamic markup page;
  - loading into system memory the other records, there being exactly p other records;
  - placing the loaded other of records within the dynamic markup page;
  - displaying the other set of records within the GUI window;
  - placing a third container within the dynamic markup page in a location of the dynamic markup page preceding the other records, the third container representing non-visible records that precede the other records in the document, there being exactly q non-visible records that precede the other records in the document, the third container having a third height equal to q multiplied by the record height;
  - placing a fourth container within the dynamic markup page in a location of the dynamic markup page following the other records, the fourth container representing non-visible records that follow the other records in the document, the fourth container having a fourth height equal to the record height multiplied by the difference between the plurality and (p+q); and
  - again redisplaying the scroll bar adjunctive to the GUI window, the redisplayed scroll bar having the slider positioned at a position of the scroll bar indicative of a location of the other records within the document.

5. The method of claim 4 wherein loading the set of records into system memory of the computing device includes loading the set of records from a database stored remote from the computing device across a network connection.

6. A computer program product comprising a non-transitory computer-readable storage medium storing a set of instructions, which, when executed by a computing device, cause the computing device to perform the operations of:
- loading into system memory of the computing device a set of records of a plurality of equally-spaced records of a document which are to be visible in a graphical user interface (GUI) window of a display device;

placing the loaded set of records within a dynamic markup page for display within the GUI window;

placing a container within the dynamic markup page, the container representing non-visible records of the plurality of equally-spaced records, the container having a height representative of a combined height of the represented non-visible records; and displaying, on the display device, a scroll bar adjunctive to the GUI window, the scroll bar allowing a user of the computing device to scroll to any arbitrary position in the document for display within the GUI window;

wherein:

the loaded set of records are at a beginning of the plurality of equally-spaced records within the document, the non-visible records following the loaded set of records within the document;

placing the container within the dynamic markup page includes placing the container in a location of the dynamic markup page following the loaded set of records;

displaying the scroll bar includes displaying a slider of the scroll bar, the slider being positioned at a topmost position of the scroll bar;

placing the container within the dynamic markup page further includes setting the height of the container to be equal to a number of the non-visible records multiplied by a record height, the number of the non-visible records being equal to the plurality minus a size of the loaded set of records, the record height being a height in pixels corresponding to the equal-spacing of the plurality of records within the document;

the set of instructions, when executed by the computing device, further cause the computing device to perform the operations of:

receiving a scroll command from the user via the scroll bar indicating that the user wishes to scroll down through the document;

loading into system memory additional records of the document following the loaded set of records, there being exactly n additional records;

displaying a new set of records within the GUI window, the new set of records including at least one record of the additional records;

modifying the container within the markup page to have a shorter height, the shorter height equaling the height minus a product of n and the record height;

redisplaying the scroll bar adjunctive to the GUI window, the redisplayed scroll bar having the slider positioned at a position below the topmost position of the scroll bar;

unloading from system memory prior records from the loaded set of records, the prior records including records that are no longer visible in the GUI window upon scrolling down through the document, there being exactly m prior records; and placing another container within the dynamic markup page in a location of the dynamic markup page preceding the new set of records, the other container representing the prior records, the other container having another height equal to m multiplied by the record height; and unloading is performed in response to making a determination that the m prior records exceed a threshold number of records, the threshold number being at least 100,000.

7. The computer program product of claim 6 wherein loading the set of records into system memory of the computing device includes loading the set of records from a database stored remote from the computing device across a network connection.

8. The computer program product of claim 6 wherein:

the container is an HTML DIV element having a respective height attribute set to the height of the container; and the other container is another HTML DIV element having a respective height attribute set to the height of the other container.

9. An apparatus comprising:

system memory;

a user interface connected to a display device and a user input device; and a controller, the controller being configured to perform the following operations:

loading into the system memory a set of records of a plurality of equally-spaced records of a document which are to be visible in a graphical user interface (GUI) window of the display device;

placing the loaded set of records within a dynamic markup page for display within the GUI window;

placing a container within the dynamic markup page, the container representing non-visible records of the plurality of equally-spaced records, the container having a height representative of a combined height of the represented non-visible records; and displaying, on the display device, a scroll bar adjunctive to the GUI window, the scroll bar allowing a user of the computing device to scroll, using the user input device, to any arbitrary position within the document for display within the GUI window;

wherein:

the loaded set of records are at a beginning of the plurality of equally-spaced records within the document, the non-visible records following the loaded set of records within the document;

placing the container within the dynamic markup page includes placing the container in a location of the dynamic markup page following the loaded set of records;

displaying the scroll bar includes displaying a slider of the scroll bar, the slider being positioned at a topmost position of the scroll bar;

placing the container within the dynamic markup page further includes setting the height of the container to be equal to a number of the non-visible records multiplied by a record height, the number of the non-visible records being equal to the plurality minus a size of the loaded set of records, the record height being a height in pixels corresponding to the equal-spacing of the plurality of records within the document;

the controller is further configured to perform the following operations:

receiving a scroll command from the user via the scroll bar indicating that the user wishes to scroll down through the document;

loading into system memory additional records of the document following the loaded set of records, there being exactly n additional records;

displaying a new set of records within the GUI window, the new set of records including at least one record of the additional records;

modifying the container within the markup page to have a shorter height, the shorter height equaling the height minus a product of n and the record height;

redisplaying the scroll bar adjunctive to the GUI window, the redisplayed scroll bar having the slider positioned at a position below the topmost position of the scroll bar; and
periodically evaluating whether the user has scrolled the slider of the scroll bar to a position indicating that the user wishes to see records of the document that are not loaded within system memory;
loading the additional records, displaying the new set of records, modifying the container, and redisplaying the scroll bar are performed in response to an evaluation that the user has scrolled the slider of the scroll bar to a position indicating that the user wishes to see records of the document that are not loaded within system memory, the evaluation having been performed as part of the periodically evaluating; and
periodically evaluating is performed at periodic intervals of one second.

10. The apparatus of claim 9 wherein the container is an HTML DIV element having a height attribute set to the height of the container.

11. A method, performed by a computing device, of rendering a document in a graphical user interface (GUI) window of a display device, the document having a plurality of equally-spaced records, the method comprising:
loading into system memory of the computing device a set of records of the plurality of equally-spaced records which are to be visible in the GUI window;
placing the loaded set of records within a dynamic markup page for display within the GUI window;
placing a container within the dynamic markup page, the container representing non-visible records of the plurality of equally-spaced records, the container having a height representative of a combined height of the represented non-visible records; and
displaying, on the display device, a scroll bar adjunctive to the GUI window, the scroll bar allowing a user of the computing device to scroll to any arbitrary position in the document for display within the GUI window;
wherein:
the loaded set of records are at a beginning of the plurality of equally-spaced records within the document, the non-visible records following the loaded set of records within the document;
placing the container within the dynamic markup page includes placing the container in a location of the dynamic markup page following the loaded set of records;
displaying the scroll bar includes displaying a slider of the scroll bar, the slider being positioned at a topmost position of the scroll bar;
placing the container within the dynamic markup page further includes setting the height of the container to be equal to a number of the non-visible records multiplied by a record height, the number of the non-visible records being equal to the plurality minus a size of the loaded set of records, the record height being a height in pixels corresponding to the equal-spacing of the plurality of records within the document;
the method further comprises:
receiving a scroll command from the user via the scroll bar indicating that the user wishes to scroll down through the document;
loading into system memory additional records of the document following the loaded set of records, there being exactly n additional records;
displaying a new set of records within the GUI window, the new set of records including at least one record of the additional records;
modifying the container within the markup page to have a shorter height, the shorter height equaling the height minus a product of n and the record height;
redisplaying the scroll bar adjunctive to the GUI window, the redisplayed scroll bar having the slider positioned at a position below the topmost position of the scroll bar;
unloading from system memory prior records from the loaded set of records, the prior records including records that are no longer visible in the GUI window upon scrolling down through the document, there being exactly m prior records; and
placing another container within the dynamic markup page in a location of the dynamic markup page preceding the new set of records, the other container representing the prior records, the other container having another height equal to m multiplied by the record height; and
unloading is performed in response to making a determination that the m prior records exceed a threshold number of records, the threshold number being at least 100,000.

12. The method of claim 11 wherein:
the container is an HTML DIV element having a respective height attribute set to the height of the container; and
the other container is another HTML DIV element having a respective height attribute set to the height of the other container.

13. The method of claim 11 wherein loading the set of records into system memory of the computing device includes loading the set of records from a database stored remote from the computing device across a network connection.

14. A method, performed by a computing device, of rendering a document in a graphical user interface (GUI) window of a display device, the document having a plurality of equally-spaced records, the method comprising:
loading into system memory of the computing device a set of records of the plurality of equally-spaced records which are to be visible in the GUI window;
placing the loaded set of records within a dynamic markup page for display within the GUI window;
placing a container within the dynamic markup page, the container representing non-visible records of the plurality of equally-spaced records, the container having a height representative of a combined height of the represented non-visible records; and
displaying, on the display device, a scroll bar adjunctive to the GUI window, the scroll bar allowing a user of the computing device to scroll to any arbitrary position in the document for display within the GUI window;
wherein:
the loaded set of records are at a beginning of the plurality of equally-spaced records within the document, the non-visible records following the loaded set of records within the document;
placing the container within the dynamic markup page includes placing the container in a location of the dynamic markup page following the loaded set of records;
displaying the scroll bar includes displaying a slider of the scroll bar, the slider being positioned at a topmost position of the scroll bar;

placing the container within the dynamic markup page further includes setting the height of the container to be equal to a number of the non-visible records multiplied by a record height, the number of the non-visible records being equal to the plurality minus a size of the loaded set of records, the record height being a height in pixels corresponding to the equal-spacing of the plurality of records within the document;

the method further comprises:

receiving a scroll command from the user via the scroll bar indicating that the user wishes to scroll down through the document;

loading into system memory additional records of the document following the loaded set of records, there being exactly n additional records;

displaying a new set of records within the GUI window, the new set of records including at least one record of the additional records;

modifying the container within the markup page to have a shorter height, the shorter height equaling the height minus a product of n and the record height;

redisplaying the scroll bar adjunctive to the GUI window, the redisplayed scroll bar having the slider positioned at a position below the topmost position of the scroll bar;

unloading from system memory prior records from the loaded set of records, the prior records including records that are no longer visible in the GUI window upon scrolling down through the document, there being exactly m prior records; and placing another container within the dynamic markup page in a location of the dynamic markup page preceding the new set of records, the other container representing the prior records, the other container having another height equal to m multiplied by the record height; and unloading is performed in response to making a determination that the prior records have a combined size exceeding a threshold size, the threshold size being at least one gigabyte.

15. The method of claim 14 wherein loading the set of records into system memory of the computing device includes loading the set of records from a database stored remote from the computing device across a network connection.

* * * * *